United States Patent
Deng

(10) Patent No.: US 11,350,202 B2
(45) Date of Patent: May 31, 2022

(54) BLUETOOTH HEADSET APPLICABLE TO DIFFERENT HEAD SHAPES

(71) Applicant: SHENZHEN XIWXI TECHNOLOGY CO., LTD., Shenzhen (CN)

(72) Inventor: Xiuhong Deng, Shenzhen (CN)

(73) Assignee: SHENZHEN XIWXI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/136,212

(22) Filed: Dec. 29, 2020

(65) Prior Publication Data

US 2022/0124430 A1   Apr. 21, 2022

(30) Foreign Application Priority Data

Oct. 16, 2020   (CN) .......................... 202011111446.3

(51) Int. Cl.
*H04R 1/10*   (2006.01)
*H04W 4/80*   (2018.01)

(52) U.S. Cl.
CPC ......... *H04R 1/1066* (2013.01); *H04R 1/1075* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2014/0321661 A1* | 10/2014 | Alao | .................... | H04R 5/0335 381/74 |
| 2020/0376335 A1* | 12/2020 | Wan | ........................ | H04W 4/80 |
| 2021/0105552 A1* | 4/2021 | Khaleghimeybodi | ....................... | H04R 1/1041 |
| 2021/0112329 A1* | 4/2021 | Zhang | ...................... | H04R 1/02 |
| 2021/0211790 A1* | 7/2021 | Wang | ..................... | G02C 11/10 |

* cited by examiner

*Primary Examiner* — Kenny H Truong
(74) *Attorney, Agent, or Firm* — Li & Cai Intellectual Property (USA) Office

(57) ABSTRACT

A Bluetooth headset applicable to different head shapes is provided, which comprises: a flexible belt body (1) looped around the head, and two headset bodies (2); wherein an interior of each headset body (2) comprises a base (23) with a circuit board or a battery therein, a sound output part (21) with a loudspeaker therein, and the sound output part (21) and the base (23) are connected by a position adjustment rod (22), and wherein two bases (23) of the headset body are respectively fixed to the flexible belt body (1). The Bluetooth headset has the characteristics of not compressing the ears and ear canals and falling off during exercise, and being applicable to users of different head shapes.

14 Claims, 3 Drawing Sheets

BLUETOOTH HEADSET APPLICABLE TO DIFFERENT HEAD SHAPES

FIELD OF THE DISCLOSURE

The present disclosure relates to the field of headset, in particular, to a Bluetooth headset applicable to different head shapes.

BACKGROUND OF THE DISCLOSURE

Headsets are usually divided into in-ear and non-in-ear. In-ear headsets should be inserted into the ear canal when in use, which not only causes discomfort due to pressure on the ear canal, but also causes great hearing damage, and is easy to fall off and is not suitable for sports use. Non-in-ear headsets usually use a C-shaped bracket to clamp the two headset bodies on the ears. The clamping force exerted by the bracket presses the ears, causing discomfort when worn for a long time, and it is easy to fall off during exercise.

In view of this, it is necessary to develop a Bluetooth headset that does not fall off during exercise, does not compress the ears and ear canals, and can be applied to different head shapes.

SUMMARY OF THE DISCLOSURE

The purpose of the present disclosure is to provide a Bluetooth headset applicable to different head shapes. The Bluetooth headset does not compress the ears and ear canals, does not fall off during exercise, and is suitable for use with different head shapes.

In order to achieve the above objectives, the technical solutions adopted by the present disclosure are as follows.

A Bluetooth headset applicable to different head shapes is provided, comprising: a flexible belt body looped around the head, and two headset bodies; wherein an interior of each headset body comprises a base with a circuit board or a battery therein, a sound output part with a loudspeaker therein, and the sound output part and the base are connected by a position adjustment rod, and wherein two bases of the two headset bodies are respectively fixed to the flexible belt body.

Preferably, the two headset bodies are positioned on the flexible belt body such that when the flexible belt body is fixed to a head, the two bases of the two headset bodies are held on upper front sides, upper right sides or upper rear sides of the two ears, and the sound output parts are held at a position adjacent to ear canals.

Preferably, each of the sound output parts comprises a plurality of speakers.

In a first preferred solution, the position adjustment rod is a deformable rod body and the position adjustment of the sound output part is embodied through the deformation of the deformable rod body.

In a second preferred solution, the position adjustment rod is a rigid rod body, the rigid rod body and the base are rotatably connected, and the position adjustment of the sound output part is embodied through the rotation of the rigid rod body relative to the base.

In a third preferred solution, the position adjustment rod is a deformable rod body, the deformable rod body and the base are rotatably connected, and the position adjustment of the sound output part is embodied through the deformation of the deformable rod body and/or the rotation of the deformable rod body relative to the base.

In a fourth preferred solution, the position adjustment rod is a telescopic rod body and the position adjustment of the sound output part is embodied through stretching or compressing the telescopic rod body.

Preferably, the circuit board is installed in the base of one of the headset bodies, and the battery is installed in the base of the other one of the headset bodies.

Preferably, the base has a flat structure.

Preferably, the flexible belt body comprises three sections, and the bases of the headset bodies are mounted between two adjacent sections through a connecting mechanism.

Preferably, the connecting mechanism comprises a hole array provided on an end of the section, and a needle array provided at the base. More preferably, a first groove is further provided on one side of the hole array on the end of the section, and the first groove is in a sealing fit with a first protruding bar of the base; or a second protruding bar is further provided on one side of the hole array on the end of the section, and the second protruding bar is in a sealing fit with the second groove in the base.

Preferably, the flexible belt body is a silicone belt, a rubber belt, a polyurethane (PU) belt or a thermoplastic elastomer (TPE) belt. The rubber belt is more preferably a thermoplastic rubber (TPR) belt. The polyurethane belt is more preferably a thermoplastic polyurethane (TPU) belt.

Preferably, the flexible belt body comprises a connecting buckle with adjustable elasticity.

Preferably, a glue layer is provided on a surface of the base of the headset body which is in contact with human body.

Compared with the prior art, the present disclosure has at least the following beneficial effects.

The headset is fixed on the head with a flexible belt body, which is reliable to wear and will not fall off.

The headset body neither extends into the ear canal nor presses on the outer ear, so it will not compress the ear canals and the ears, making it more comfortable to use.

The headset body is composed of a base and a sound output part connected by a position adjustment rod. The position of the sound output part can be adjusted by the position adjustment rod, so that the sound output part of the headset can be kept adjacent to ear canals when worn by people of different head shapes. Therefore, it is suitable for people with different head shapes.

When the belt body of the above-mentioned material is used and/or the surface of the headset body contacting the human body is provided with an adhesive layer, it has the function of anti-slip and waterproof, which can more effectively prevent the headset from falling off due to vibration and sweat during exercise.

The multi-section belt body is used to embody the connection between the headset body and the belt body through the cooperation of the hole array and the needle array, which has the characteristics of convenient production and favorable miniaturization of the headset body.

The installation of the Bluetooth module and the battery into the base of the two headset bodies is beneficial to miniaturization of the base of the headset body.

Figure 1:
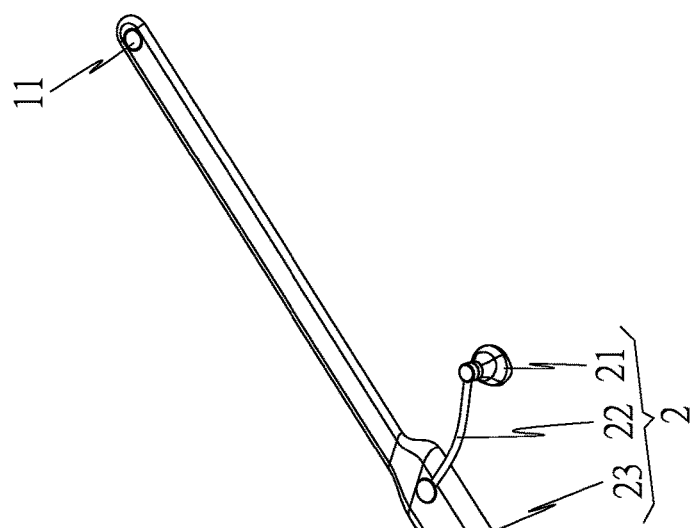
FIG. 1 is a schematic structural diagram of a headset according to an embodiment.

Reference Numeral:

1. flexible belt body; 11. buckle nail; 12. buckle hole; 13. section; 131. hammer-shaped part; 132. hole array; 133. first groove; 213. needle array; 232. first protruding bar; 2. headset body; 21. sound output part; 22. position adjustment rod; 23. base; 24. circuit board; 25. battery; 211. back shell; 212. speaker; 213. face shell.

DETAILED DESCRIPTION OF THE EXEMPLARY EMBODIMENTS

The present disclosure will be further described below in conjunction with the drawings and embodiments.

Reference is made to FIG. 1. The Bluetooth headset includes a flexible belt body 1 and two headset bodies 2.

The headset body 2 includes a base 23 and a sound output part 21, the circuit board 24 (referring to FIG. 2) and the battery 25 (referring to FIG. 2) of the Bluetooth headset are housed in the base 23, the speaker 212 (referring to FIG. 2) is installed inside the sound output part 21, and the sound output part 21 and the base 23 are connected by a position adjustment rod 22. The circuit board 24 includes a Bluetooth module. It is preferable to arrange two or more speakers in each sound output part 21, and it is more preferable to arrange a tweeter and a midrange speaker, or a tweeter and a woofer, or a woofer and a midrange speaker, in each sound output part 21, or to configure a tweeter, woofer and midrange speaker.

The bases 23 of the two headset bodies 2 are respectively fixed to the flexible belt body 1. The position of the headset body 2 on the flexible belt body 1 preferably satisfies the following conditions: when the flexible belt body 1 is fixed to a head, the bases 23 of the two headset bodies 2 are held the upper front side, upper right side or upper rear side of the two ears, and the sound output part 21 is held at a position adjacent to ear canals.

A plurality of buckle holes 12 are also provided at one end of the flexible belt body 1, and buckle nails 11 are also provided at the other end of the flexible belt body 1, which form a connecting buckle with adjustable elasticity. The buckle 11 cooperates with the buckle hole 12 to fix the flexible belt body 1 on the user's head.

After the base 23 of the headset body 2 is held on the head by the flexible belt body 1, the position of the sound output part 21 is adjusted by the position adjustment rod 22 to be adjacent to ear canals. In this way, when users with different head shapes wear them, the base 23 of the headset body 2 can be kept on the upper side of the ear, and the sound output part 21 of the headset body 2 can be kept adjacent to ear canals. That is, the headset has better adaptability, and it is not necessary to design headsets for different head shapes.

Figure 2:
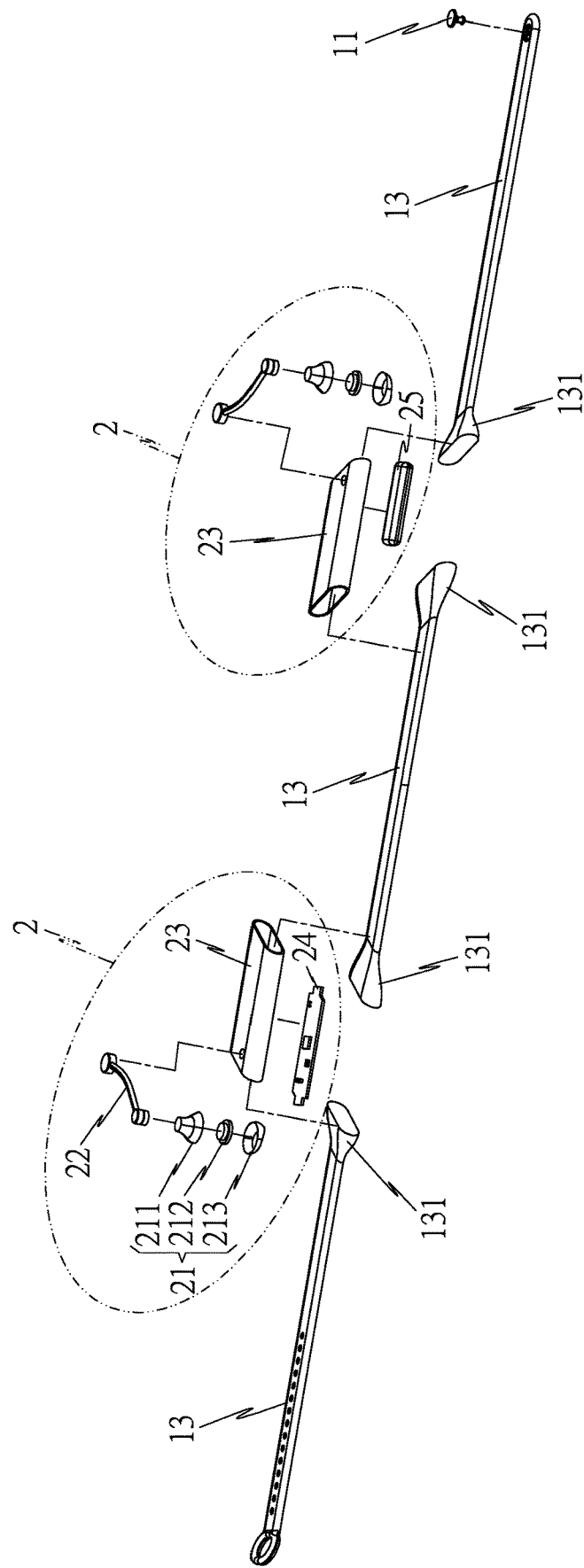
FIG. 2 is an exploded view according to FIG. 1.

Reference is made to FIG. 1 and FIG. 2. In this embodiment, the position adjustment rod 22 is a deformable rod body, and the rod body and the base 23 are rotatably matched. The rotating connection structures that can be used include but are not limited to shafts, ball joints, etc. The rod body and the sound output part 21 are fixedly matched. On the one hand, applying an external force to the rod body can deform the rod body and change the position of the sound output part 21; on the other hand, rotating the rod body can change the angle between the rod body and the base 23, and also achieve the purpose of changing the position of the sound output part 21. The rod adopts a tubular structure so that the cable can pass through it.

As a second embodiment, the position adjustment rod 22 is a deformable rod body, one end of the rod body is fixedly matched with the base 23, the other end of the rod body is fixedly matched with the sound output part 21, and the position adjustment of the sound output part 21 is embodied by the deformation of the rod body.

As a third embodiment, the position adjustment rod 22 adopts a rigid rod body, that is, a non-deformable rod body. The rigid rod body and the base 23 are rotatably matched. The rotating connection structure that can be adopted includes but is not limited to a shaft, a ball head, etc. When the rod body is rotated, the angle between the rod body and the base 23 can be changed, thereby changing the position of the sound output part 21.

As a fourth embodiment, the position adjustment rod 22 is a telescopic rod body, one end of the rod body is fixedly matched with the base 23, and the other end of the rod body is fixedly matched with the sound output part 21. By stretching or compressing the telescopic rod body, the overall length of the rod body is changed, so that the position adjustment of the sound output part 21 is embodied.

Reference is made to FIG. 2. The circuit board 24 of the Bluetooth headset is installed in the base 23 of one of the headset bodies 2, and the battery 25 is installed in the base 23 of the other one of the headset bodies 2. That is, the circuit board 24 and the battery 25 are separated in the base 23 of the two headset bodies 2. The configuration makes the volume of the headset body 2 further miniaturized, and makes the weight of the two headset bodies 2 more balanced, which is more beneficial to the stable maintenance of the headset body 2 on the head.

It can be seen from FIG. 1 and FIG. 2 that the base 23 has a flat structure. On the one hand, the contact area between the base 23 and the head can be increased during wearing, which is conducive to stable wearing. On the other hand, the thickness of the base 23 can be reduced. The appearance effect of wearing is more beautiful.

As shown in FIG. 2, the sound output part 21 of the headset body 2 is composed of a face shell 213, a back shell 211 and a speaker 212. The position adjustment rod 22 is fixed to the back shell 211, and the speaker 212 is accommodated in the face shell 213 and the back shell 211.

As can be seen from FIGS. 1 and 2, the flexible belt body 1 includes three sections 13, and the bases 23 of the headset bodies 2 are installed between two adjacent sections 13 through a connecting mechanism. In this embodiment, the connecting mechanism includes a hammer-shaped portion 131 provided at the end of the section 13, and the hammer-shaped portion 131 is accommodated in the base 23 and is engaged with the base 23.

Figure 3:
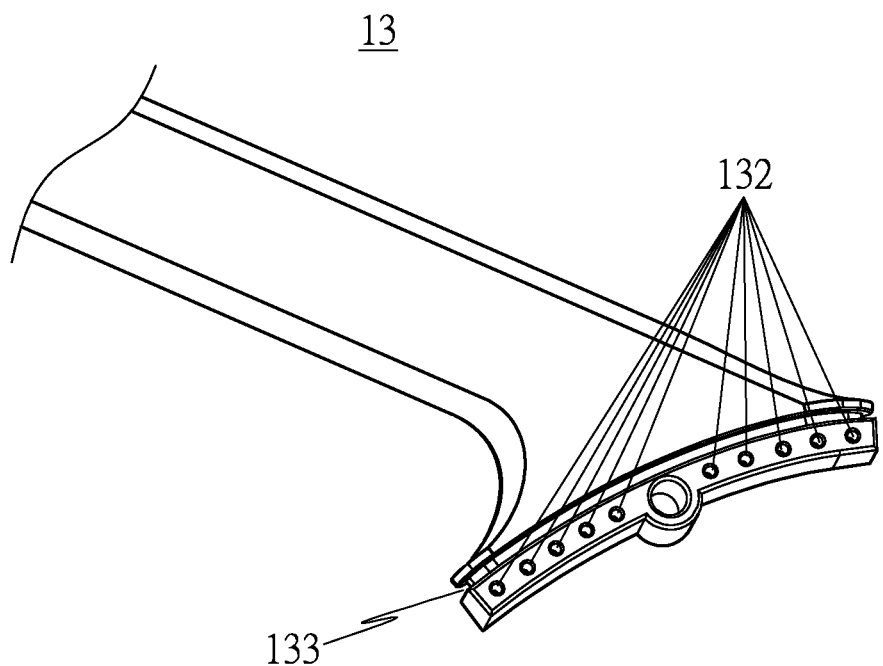
FIG. 3 is a schematic diagram of the hole array and the first groove on a section of the belt body of another embodiment.
Figure 4:
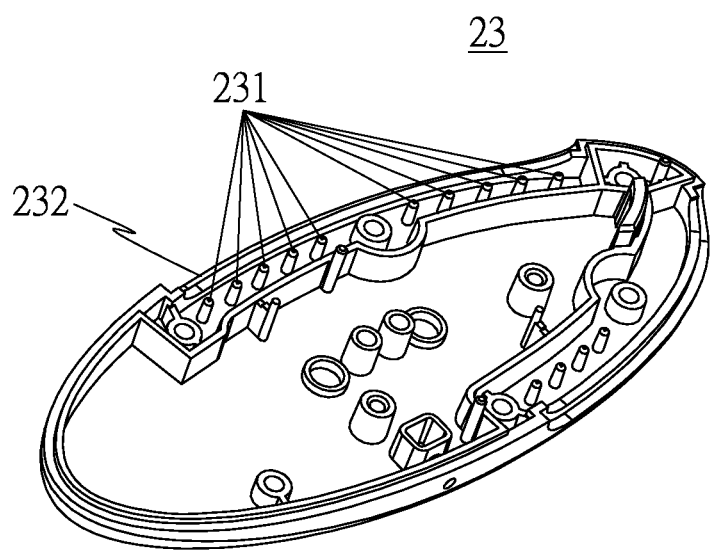
FIG. 4 is a schematic diagram of the needle array and the first protruding bar in the base of the headset body of another embodiment.

Another connection mechanism of the section 13 and the base 23 is shown in FIGS. 3 and 4. As shown in FIG. 3 and FIG. 4, the specific connection mechanism includes a hole array 132 provided at the end of the section 13 and a needle array 231 provided at the base 23. The hole array 132 and the corresponding needle array 231 are correspondingly mated to combine the base 23 and the section 13 into one body.

Further, a first groove 133 is further provided on one side of the hole array 132 on the end of the section 13, and the first groove 133 is in a sealing fit with the first protruding bar 232 of the base 23, which can prevent water from entering the base 23 from the connection part of the section 13 and the base 23. Understandably, a second protruding bar may also be provided on one side of the hole array 132 on the end of the section 13, and a second groove is correspondingly provided on the base 23. The second protruding bar and the second groove are sealed and matched to prevent water from entering the base 23 from the connection part of the section 13 and the base 23.

The above-mentioned multiple sections 13 are combined to form a flexible belt body 1, and each section 13 and the base 23 are combined by a connecting mechanism, which makes the assembly of the belt body and the headset body 2 easy, and the connecting part occupies a small space, which is beneficial to miniaturization of the headset body 2.

The flexible belt body 1 preferably has an elastic belt body so as to reliably fix the headset body 2 on the head of the user while reducing the pressure on the head. The flexible belt body 1 is preferably a silicone belt body, a rubber belt body, a polyurethane (PU) belt body or a thermoplastic elastomer (TPE) belt body to further have the characteristics of anti-slip, waterproof and durable. When a rubber belt is used for the flexible belt 1, a thermoplastic rubber (TPR) belt is more preferable. When the flexible belt 1 adopts a polyurethane belt, it is more preferably a thermoplastic polyurethane (TPU) belt.

The tightness can be adjusted by matching the buckle nail 11 with different buckle holes 12.

Furthermore, an adhesive layer is provided on the surface of the base 23 of the headset body 2 that is in contact with human body. On the one hand, the adhesive layer makes the user feel soft and comfortable, and on the other hand, it plays a role of anti-slip and waterproof to prevent sweat and vibration during exercise. Fall off.

It can be seen from the foregoing that the headset of the foregoing embodiment has at least the following advantages.

1. The headset is fixed on the head with a flexible belt body 1, which is reliable to wear and will not fall off.

2. The headset body 2 neither extends into the ear canal nor presses on the outer ear, so it will not compress the ear canal and ear, making it more comfortable to use.

3. The headset body 2 is formed by connecting the base 23 and the sound output part 21 through a position adjustment rod 22. The position of the sound output part 21 can be adjusted by the position adjustment rod 22, so that when people with different head shapes wear the sound part 21, the sound output part 21 of the headset can be kept adjacent to ear canals, so it can be used by people with different head shapes.

3. By means of the selection of the material of the flexible belt body 1, and the surface of the base 23 of the headset body 2 that is in contact with human body is provided with a glue layer, the present disclosure has a non-slip and waterproof function, which can more effectively prevent the headset from falling off due to vibration and sweat during exercise.

4. The multi-section flexible belt body 1 is used to embody the connection between the headset body 2 and the belt body through the cooperation of the hole array 132 and the needle array 231, which has the characteristics of convenient production and facilitates the miniaturization of the headset body 2.

5. The installation of the Bluetooth module (circuit board 24) and the battery 25 in the base 23 of the two headset bodies 2 is beneficial to miniaturization of the base 23 of the headset body 2.

The present disclosure has been described in detail through specific embodiments described above, and these detailed descriptions are only limited to helping those skilled in the art understand the content of the present disclosure, and should not be construed as limiting the protection scope of the present disclosure. Various modifications, equivalent transformations, etc. performed by those skilled in the art to the above solutions under the concept of the present disclosure should be included in the protection scope of the present disclosure.

What is claimed is:

1. A Bluetooth headset applicable to different heads shapes comprising:
   a flexible belt body (1) looped around the head; and
   two headset bodies (2),
   wherein an interior of each headset body (2) comprises a base (23) with a circuit board (24) or a battery (25) therein, a sound output part (21) with a loudspeaker therein, and the sound output part (21) and the base (23) are connected by a position adjustment rod (22),
   wherein two bases (23) of the two headset bodies (2) are respectively fixed to the flexible belt body (1),
   wherein the circuit board (24) is installed in the base (23) of one of the headset bodies (2), the battery (25) is installed in the base (23) of the other one of the headset bodies (2); and/or
   the base (23) has a flat structure; and/or
   the flexible belt body (1) comprises three sections (13), and the bases (23) of the headset bodies (2) are mounted between two adjacent sections (13) through a connecting mechanism,
   wherein the connecting mechanism comprises a hole array (132) provided on an end of the section (13), and a needle array (231) provided at the base (23), and
   wherein a first groove (133) is further provided on one side of the hole array (132) on the end of the section (13), and the first groove (133) is in a sealing fit with a first protruding bar (232) of the base (23); or a second protruding bar is further provided on one side of the hole array (132) on the end of the section (13), and the second protruding bar is in a sealing fit with the second groove in the base.

2. The Bluetooth headset according to claim 1, wherein the two headset bodies (2) are positioned on the flexible belt body (1) such that when the flexible belt body (1) is fixed to a head, the two bases (23) of the two headset bodies (2) are held on upper front sides, upper right sides or upper rear sides of two ears, and the sound output parts (21) are held at a position adjacent to ear canals.

3. The Bluetooth headset according to claim 2, wherein the flexible belt body (1) is a silicone belt, a rubber belt, a polyurethane belt or a thermoplastic elastomer belt; and/or
   the flexible belt body (1) comprises a connecting buckle with adjustable elasticity; and/or
   a glue layer is provided on a surface of the base (23) of the headset body (2) which is in contact with human body.

4. The Bluetooth headset according to claim 1, wherein each of the sound output parts (21) comprises a plurality of speakers.

5. The Bluetooth headset according to claim 4, wherein the flexible belt body (1) is a silicone belt, a rubber belt, a polyurethane belt or a thermoplastic elastomer belt; and/or
   the flexible belt body (1) comprises a connecting buckle with adjustable elasticity; and/or
   a glue layer is provided on a surface of the base (23) of the headset body (2) which is in contact with human body.

6. The Bluetooth headset according to claim 1, wherein the position adjustment rod (22) is a deformable rod body and the position adjustment of the sound output part (21) is embodied through the deformation of the deformable rod body.

7. The Bluetooth headset according to claim 6, wherein the flexible belt body (1) is a silicone belt, a rubber belt, a polyurethane belt or a thermoplastic elastomer belt; and/or
the flexible belt body (1) comprises a connecting buckle with adjustable elasticity; and/or
a glue layer is provided on a surface of the base (23) of the headset body (2) which is in contact with human body.

8. The Bluetooth headset according to claim 1, wherein the position adjustment rod (22) is a rigid rod body, the rigid rod body and the base (23) are rotatably connected, and the position adjustment of the sound output part (21) is embodied through the rotation of the rigid rod body relative to the base (23).

9. The Bluetooth headset according to claim 8, wherein the flexible belt body (1) is a silicone belt, a rubber belt, a polyurethane belt or a thermoplastic elastomer belt; and/or
the flexible belt body (1) comprises a connecting buckle with adjustable elasticity; and/or
a glue layer is provided on a surface of the base (23) of the headset body (2) which is in contact with human body.

10. The Bluetooth headset according to claim 1, wherein the position adjustment rod (22) is a deformable rod body, the deformable rod body and the base (23) are rotatably connected, and the position adjustment of the sound output part (21) is embodied through the deformation of the deformable rod body and/or the rotation of the deformable rod body relative to the base (23).

11. The Bluetooth headset according to claim 10, wherein the flexible belt body (1) is a silicone belt, a rubber belt, a polyurethane belt or a thermoplastic elastomer belt; and/or
the flexible belt body (1) comprises a connecting buckle with adjustable elasticity; and/or
a glue layer is provided on a surface of the base (23) of the headset body (2) which is in contact with human body.

12. The Bluetooth headset according to claim 1, wherein the position adjustment rod (22) is a telescopic rod body and the position adjustment of the sound output part (21) is embodied through stretching or compressing the telescopic rod body.

13. The Bluetooth headset according to claim 12, wherein the flexible belt body (1) is a silicone belt, a rubber belt, a polyurethane belt or a thermoplastic elastomer belt; and/or
the flexible belt body (1) comprises a connecting buckle with adjustable elasticity; and/or
a glue layer is provided on a surface of the base (23) of the headset body (2) which is in contact with human body.

14. The Bluetooth headset according to claim 1, wherein the flexible belt body (1) is a silicone belt, a rubber belt, a polyurethane belt or a thermoplastic elastomer belt; and/or
the flexible belt body (1) comprises a connecting buckle with adjustable elasticity; and/or
a glue layer is provided on a surface of the base (23) of the headset body (2) which is in contact with human body.

* * * * *